No. 665,871. Patented Jan. 15, 1901.
A. W. BROOKS.
COMBINED RAKE, HOE, AND SOD CUTTER.
(Application filed Apr. 19, 1900.)
(No Model.)
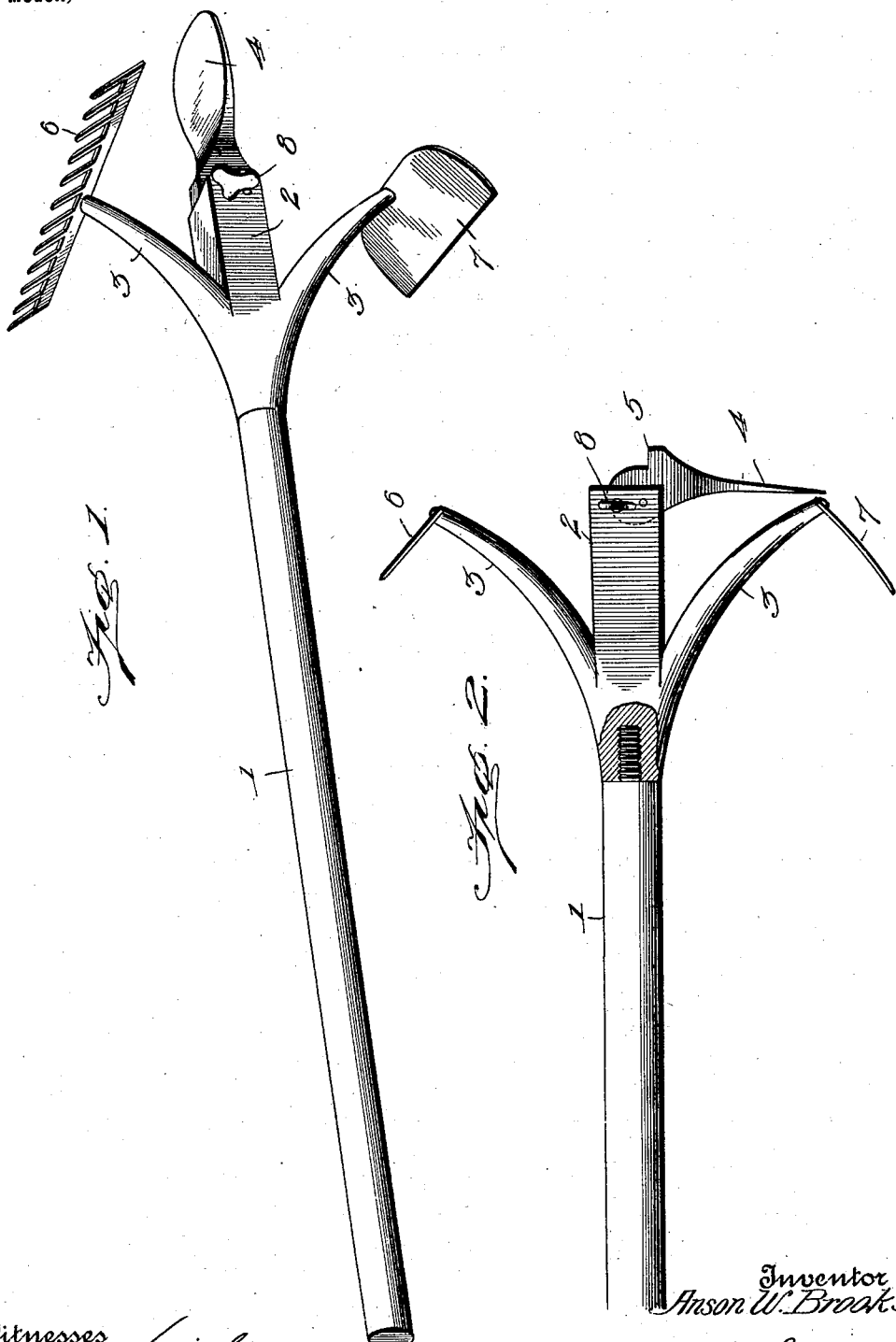
Witnesses
Inventor
Anson W. Brooks,
By Victor J. Evans
Attorney

UNITED STATES PATENT OFFICE.

ANSON W. BROOKS, OF DALTON, MASSACHUSETTS.

COMBINED RAKE, HOE, AND SOD-CUTTER.

SPECIFICATION forming part of Letters Patent No. 665,871, dated January 15, 1901.

Application filed April 19, 1900. Serial No. 13,531. (No model.)

*To all whom it may concern:*

Be it known that I, ANSON W. BROOKS, a citizen of the United States, residing at Dalton, in the county of Berkshire and State of Massachusetts, have invented new and useful Improvements in a Combined Rake, Hoe, and Sod-Cutter, of which the following is a specification.

This invention relates to new and useful improvements in a combined rake, hoe, and sod-cutter; and its primary object is to provide a device of this character which is simple and durable in construction, cheap to manufacture, and each of the parts of which may be readily placed in position for use.

To this end the invention consists in the novel construction and combination of parts hereinafter more fully described and claimed, and illustrated in the accompanying drawings, showing the preferred form of my invention, and in which—

Figure 1 is a perspective view thereof, showing the cutter in position; and Fig. 2 is a side elevation thereof with the cutter swung out of operating position.

Referring to said figures by numerals of reference, 1 is a handle of ordinary construction, to which is secured at one end a stem 2, having arms 3 projecting from opposite sides thereof and preferably curved, as shown. The stem 2 is forked at its end, and pivoted within this end is the end of a cutting-blade 4, formed of any suitable material and of any desired shape. This end of the blade is provided with a shoulder 5, adapted to bear upon the inner wall of the slot formed within the forked end of the stem, and thereby limit the movement of the cutting-blade in one direction. The cutting edge of the blade 4 is preferably arranged in a plane at right angles to the plane of the arms 3.

Secured to one of the arms 3 in any suitable manner is a rake-head 6, having teeth of suitable construction extending therefrom, as shown, and secured to the opposite arm of the device is the blade of a hoe 7. The rake and hoe are each so arranged as to be readily operated from the handle 1.

The manner of using the hoe and rake will be readily understood from the foregoing description. When it is desired to employ the sod-cutter, the same is swung outward upon its pivot until the shoulder thereon retards the farther movement thereof. A screw 8, which extends into the end of the stem 2, is then screwed down upon the end of the cutter 4, thereby securely holding the same in position. The said blade may then be readily operated from the handle 1, as is obvious. When it is desired to move the blade 4 out of the way, it is merely necessary to swing the same forward upon its pivot and lock the same in such position by means of the set-screw 8.

In the foregoing description I have shown the preferred form of my invention; but I do not limit myself thereto, as I am aware that modifications may be made therein without departing from the spirit or sacrificing the advantages thereof, and I therefore reserve the right to make such changes and alterations as may fairly come within the scope of my invention.

Having thus fully described my invention, what I claim as new, and desire to secure by Letters Patent, is—

As a new article of manufacture, a head for an agricultural implement comprising a stem having a squared end and outwardly-curved arms formed with and extending in opposite directions from said stem, said arms having implements attached thereto; a cutting-blade pivotally mounted within a slot formed within the end of the stem; a shoulder integral with said blade and adapted to bear upon the stem and limit the movement of the blade in one direction; and a set-screw engaging one of the walls of the slot and adapted to bind upon the cutting-blade and lock the same at any inclination to which it is adjusted.

In testimony whereof I affix my signature in presence of two witnesses.

ANSON W. BROOKS.

Witnesses:
C. A. PARKIN,
T. M. POMEROY.